United States Patent [19]

Smoak et al.

[11] Patent Number: 4,852,299
[45] Date of Patent: Aug. 1, 1989

[54] SELF RELEASING TREE SUPPORT STRAP

[76] Inventors: Copley H. Smoak, 8308 Mariner Crt.; Terrill L. Chalfant, 8304 Mariner Crt., both of Gaithersburg, Md. 20879

[21] Appl. No.: 119,401

[22] Filed: Nov. 10, 1987

Related U.S. Application Data

[63] Continuation-in-part of Ser. No. 894,215, Aug. 7, 1986.

[51] Int. Cl.$^4$ .............................................. A01G 17/06
[52] U.S. Cl. ...................................................... 47/42
[58] Field of Search .......................... 47/9, 42, 43, 74

[56] References Cited

U.S. PATENT DOCUMENTS

| | | | |
|---|---|---|---|
| 2,000,911 | 5/1935 | Balousek | 47/47 |
| 3,867,324 | 2/1975 | Clendinning et al. | 47/9 |
| 3,929,937 | 12/1975 | Clendinning et al. | 47/74 |
| 4,073,090 | 2/1978 | Lucia | 47/43 |
| 4,318,246 | 3/1982 | Jungbluth et al. | 47/42 |
| 4,399,973 | 8/1983 | Spry et al. | 47/47 |

FOREIGN PATENT DOCUMENTS

| | | | |
|---|---|---|---|
| 148115 | 1/1903 | Denmark | 47/42 |
| 519133 | 3/1940 | United Kingdom | 47/43 |

OTHER PUBLICATIONS

Harris et al., "Staking Landscape Trees", University of California, Agriculture Extension, AXT-311, Rev 7/72, pp. 9-10.

Primary Examiner—Robert A. Mafer
Assistant Examiner—Lynda M. Cofsky
Attorney, Agent, or Firm—James J. Brown

[57] ABSTRACT

A tree support strap is described which is made of a climatologically degradeable material so that it will deteriorate and fall away from the tree after an initial period of support lasting a predetermined period of time. The support strap attaches to conventional stays or guy wires but does not require these wires to actually contact the trunk of the tree.

8 Claims, 1 Drawing Sheet

4,852,299

SELF RELEASING TREE SUPPORT STRAP

CROSS-REFERENCE TO RELATED APPLICATIONS

This application is a continuation-in-part of application Ser. No. 894,215 filed Aug. 7, 1986.

SUMMARY OF THE INVENTION

The present invention is directed to a tree support strap for encircling and providing support to a tree over a predetermined, finite period of time. The support strap of the invention is uniquely formed from a climotologically degradeable material so that it provides support to the tree only for a limited period of time and then deteriorates to the point where it falls away from the tree, thereby avoiding any impediment to the growth of the tree itself or requiring further attention.

BACKGROUND OF THE INVENTION

All new planted trees beyond the size of seedlings require initial external support until the tree's root system has developed and the tree itself has attained sufficient stature and stability to remain and grow in the desired upright position. It has frequently been the practice to stabilize newly planted trees by providing metallic wire that is attached to stakes driven into the ground on each side and in some manner wrapped around the trunk of the tree. Generally, in order to keep the wire from cutting into the trunk of the tree, a piece of garden hose is put around the wire where it rubs the tree.

Although these guy wires are generally effective in providing the required stabilization for the tree, it is often the case that the wire is never removed and remains more or less permanently attached to the tree even after the associated wooden stakes have become dislodged or rotted. Eventually, this wire often becomes embedded in the tree trunk as the tree's diameter increases and can even result in malformation of the tree or strangulation.

The prior art has, in fact, suggested several devices for addressing the problems associated with tree support systems. U.S. Pat. No. 4,366,647 to Daun describes an expandible tree support collar which is essentially a coil of flexible material. U.S. Pat. Nos. 3,526,056 to Stropkay, 3,521,401 to Shisler, 3,226,882 to Lichtenthaler and 1,844,024 to Weber, all describe adjustable collars or straps for placement around the trunk of a tree. U.S. Pat. No. 4,222,198 to Napolitano, et al, describes a tree tie for placement around the trunk of a tree having a resilient collar. U.S. Pat. No. 4,073,090 to Lucia describes a self-releasing tree collar having interlocking joints which disengage as the tree grows and expands in diameter.

Devices of the prior art have, however, generally required either complex structure or mechanical features which contribute to the overall expense thereby diminishing the use and practicality of the device.

It is accordingly, an object of the present invention to provide a simple, inexpensive but effective device for stabilizing growing trees for a short period of time subsequent to their being placed in the ground. It is a further object of the present invention to provide a tree support device which will climatologically degrade after a predetermined period of time so that it forms no impediment to the growth and well-being of the tree and will eventually fall away from the tree without requiring further attention.

DETAILED DESCRIPTION OF THE INVENTION

The present invention is directed to a tree support strap for providing support to a tree over a predetermined, finite period of time. The tree support strap of the present invention comprises a flat, elongated strip of climatologically degradeable material with memory whose ends are joined by a wire. This strap is passed around the trunk of the tree being stabilized and a length of wire or other material such as rope passed through holes in the ends of the strap and then attached to an appropriate stake or other static structure to provide the required stabilization. In order to fully stabilize a tree, it may be desirable to provide a plurality of such straps attached to appropriate stakes or other stabilizing structures external to the tree itself.

Figure 1:
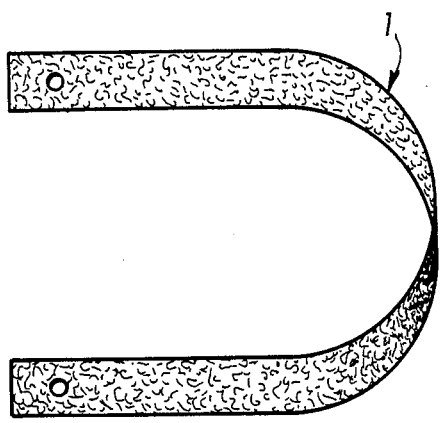
FIG. 1 is a perspective view of the tree support strap of the present invention in the form of a supporting strap.
Figure 2:
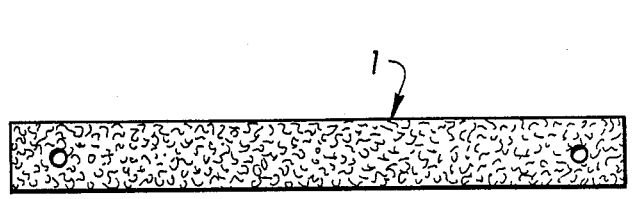
FIG. 2 illustrates a strap from which the present invention is formed.
Figure 3:
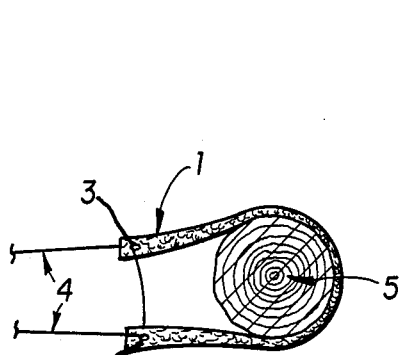
FIG. 3 is an overhead cross-section view illustrating the tree support strap of the present invention in place around a tree trunk with guy wire attached.
Figure 4:
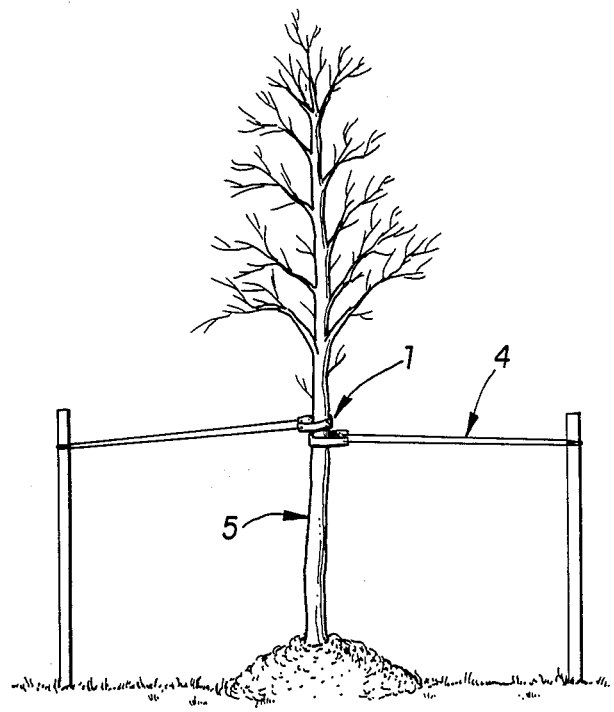
FIG. 4 illustrates a tree implanted in the ground with stakes and the straps of the present invention applied to provide stabilization.

The structure and features of the present invention will, however, be more fully appreciated by having reference to the accompanying drawings. Directing attention to FIGS. 1 and 2 collectively, it will be seen that an elongated piece of climatological degradeable material 1 shown also in FIG. 2 is joined at its ends to form a circular member as shown in FIG. 1 of the drawings. Directing attention to FIG. 3 of the drawings, it will be seen that the circular ring 1 is wrapped around the trunk of a tree 5. The ends of the strap 1 have holes 2 and 3 through which a wire 4 is passed which is then led to a stabilizing structure such as a stake. FIG. 4 of the drawings illustrates the staking of a tree by means of straps 1 attached to the guy wires 4.

A particularly significant feature of the present invention is that the guy wires which connect the strap with the stake or other stabilizing structure do not themselves encircle or contact the tree at any point. Further, the device of the present invention is uniquely simple in its structure since it consists essentially of an encompassing strap of appropriate material being applied to the trunk of a tree.

A further significant and important feature of the present invention is that the tree support strap is structured and designed to be climatologically degradeable and to essentially disintegrate (break down) after a predetermined period of time so that it forms no impediment to the health and well-being of the tree to which it is applied. It will be apparent from the drawings that once the strap has in fact disintegrated, it will simply fall away from the trunk of the tree and cannot remain wrapped around the tree to strangle it or otherwise become embedded in the tree structure. Depending somewhat on the species of tree being planted, the season in which the planting is done and the particular climatic zone in which the tree is planted, differing periods of time will be most desirable for maintaining the stabilizing influence of the support strap of the present invention. Generally, however, a growing season of one year or its equivalent will be appropriate for most species to develop sufficient root system and structure that they can exist without the support provided by the present invention and without the danger of becoming deformed or disoriented in the ground.

It will be apparent to those of ordinary skill in the art that the actual selection of climatological degradeable material for use and in accordance with the present invention will depend to a degree on the size and type of tree being stabilized as well as the particular climatic conditions and location of the planting of the tree. Generally, in order to provide the requisite stabilization during the period in which the tree is becoming established, an initial tensile strength of from about 100 to 250 pounds in the strap is desirable with a projected degraded tensile strength of about 15 to 50 pounds in a period of nine to twelve months. Various materials can be selected to meet the required criteria for strength and climate degradability. For example, such plastic materials as polyethylene, polyester resins, e.g., terephthalic acid-ethylene glycol polymers, flexible forms of nylon, polyurethane resins or the like may be employed. It has been found that the most desirable combination of features can be obtained using flexible formulations of vinyl plastics, especially plasticized vinyl chloride polymers, e.g., vinyl chloride copolymers containing small amounts of vinyl acetate, or polyvinyl chloride.

When needed, e.g., with the vinyl plastics, a wide choice of usable plasticizers is available for compounding the plastic composition. So-called "hot stretch plasticizers" are particularly desirable, such as dioctyl phthalate and dibenzyl denzoate, but any of the other known plasticizers which are not easily leeched or excluded from the plastic mass may be employed to give the desired amount of flexibility. Of course, the amount of plasticizer used will depend upon the particular plasticizer, and the resin used in making the extrusion material. Some forms of usable plastics, e.g., flexible grades of polyethylene and nylon, may be used without use of plasticizers.

When vinyl polymers or the majority of other usable plastics are employed, it is necessary to add a so-called "blowing agent" in order to cause the plastic to expand into a porous sponge-like structure. However, in the case of the polyurethane materials, the addition of a blowing agent is unnecessary, because expansion of the plastic is obtained by formation in situ of an expansion agent during the fabrication process. Where a blowing agent is employed, a number of different materials may be used. For example, organic blowing agents, e.g., dinitrosos pentamethylene tetramine, are satisfactory, but better results with less expense are obtained using inorganic blowing agents such as sodium bicarbonate, ammonium carbonate, ammonium bicarbonate and ammonium sesquicarbonate. The blowing agent is usually employed in about 0.5–10% by weight of the plastic mass, the exact amount being governed by the density desired and this, in turn, being controlled to some extent by the plastic and amount of plasticizer used. Preferred materials for use in the present invention are described in U.S. Pat. No. 2,807,505 to Weitzel, incorporated herein by reference.

The actual dimensions of the materials used for the support strap of the invention will also depend to some extent on the particular material selected, the desired strength and desired period of support. Typically, a strip about 2–4 mm. thick and ½ to 1 inch wide can be used. A typical example of a strap useful in accordance with the present invention and illustrated in the drawings is made of a combination of the polymers described above in a sheet 2.55 mm. thick. Typically, in order to form a circular ring having the requisite strength, a strap approximately twenty-five inches long is required with a width of ⅝ of an inch.

It will be apparent to those of ordinary skill in the art that various additional materials of differing structure and dimensions can be usefully employed within the context and spirit of the present invention, depending for example, on the conditions of application and especially the duration of support required and climatic environment to be encountered.

What is claimed is:

1. A self-releasing tree support strap for encircling and providing support to a tree over a single growing season sufficient for the tree to develop its own support system, which comprises a flexible elongated member with memory comprising a strap composed of a climatologically degradable material having sufficient strength over said growing season to provide support to said tree without impeding the growth and well-being of the tree, but self degrading thereafter under climatic influences sufficiently to deteriorate and fall away from said tree at the end of said growing season and without requiring further intervention.

2. The tree support strap of claim 1 which is made of an elastomeric material.

3. The tree support strap of claim 1 which is made of a polyolefin.

4. The tree support strap of claim 1 in which said material is woven.

5. The tree support strap of claim 1 in which said material is a cast polymer.

6. The tree support strap of claim 1 in which a single length of wire or rope passes through holes in the ends of said tree encircling strap and is then attached at a point remote from said holes to a means for providing said tree support without said wire or rope itself encircling said tree.

7. The tree support strap of claim 1 wherein said means is a stake driven into the ground.

8. The tree support strap of claim 1 wherein said predetermined, finite period of time is about one growing season.

* * * * *